(12) United States Patent
Hagbrandt et al.

(10) Patent No.: US 7,518,058 B1
(45) Date of Patent: Apr. 14, 2009

(54) POWERFEEDER SPACER

(75) Inventors: Hans R. Hagbrandt, Snohomish, WA (US); Herbert P. Weisse, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/871,479

(22) Filed: Oct. 12, 2007

(51) Int. Cl.
*H01B 11/18* (2006.01)

(52) U.S. Cl. .................... 174/28; 174/113 C

(58) Field of Classification Search ............ 174/113 C, 174/111, 131 A, 28
See application file for complete search history.

(56) References Cited

U.S. PATENT DOCUMENTS

| | | | | |
|---|---|---|---|---|
| 1,089,642 | A * | 3/1914 | Honold | 174/70 R |
| 3,551,581 | A * | 12/1970 | Goodman | 174/15.7 |
| 6,622,585 | B1 * | 9/2003 | Salomonsson et al. | 74/490.02 |
| 6,943,300 | B2 * | 9/2005 | Ekeberg et al. | 174/113 R |
| 7,288,720 | B1 * | 10/2007 | Moyher et al. | 174/78 |

* cited by examiner

*Primary Examiner*—Chau N Nguyen
(74) *Attorney, Agent, or Firm*—Tung & Associates

(57) ABSTRACT

A powerfeeder spacer includes a spacer hub, a neutral cable opening having an interior cable opening wall extending through the spacer hub, a plurality of spaced-apart spacer fingers extending from the spacer hub and a plurality of spaced-apart power cable notches each having a generally curved notch wall between the plurality of spaced-apart spacer fingers.

20 Claims, 2 Drawing Sheets

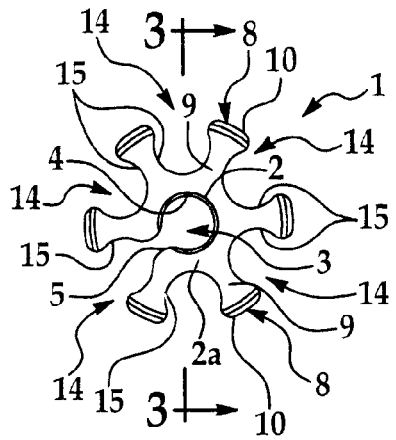
FIG. 1
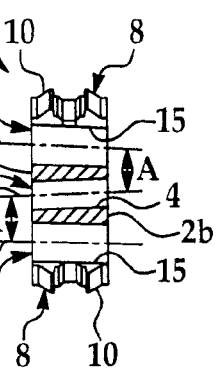
FIG. 2
FIG. 3
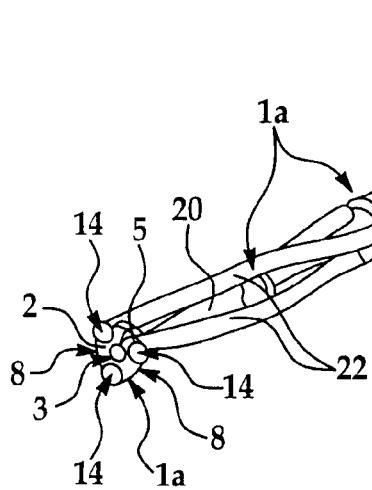
FIG. 4
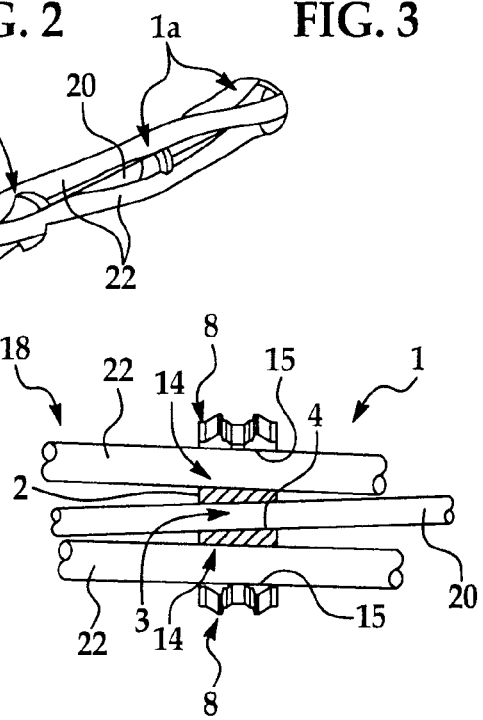
FIG. 5
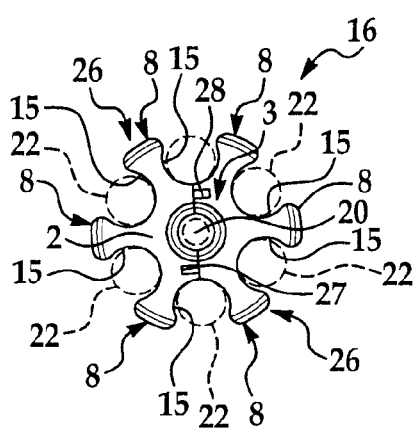
FIG. 6
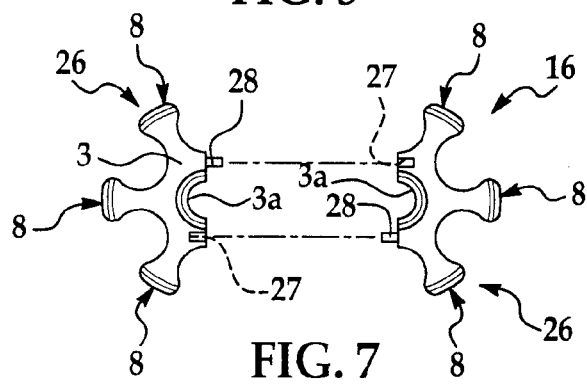
FIG. 7

POWERFEEDER SPACER

TECHNICAL FIELD

The disclosure relates to powerfeeder spacers for securing power cables in a cable bundle. More particularly, the disclosure relates to a powerfeeder spacer which may facilitate fabrication and shipping, and improve installation and maintenance methods of power cables. The spacers achieve these improvements by maintaining a specific twist and specific separation of the cables within the power feeder bundles.

BACKGROUND

In the fabrication of power cables, it may be desirable to maintain a twisted configuration of the bundle in which the cables are bound to reduce electromagnetic interference and to aid in the installation process. This eliminates the need for personnel to induce twist in the cable bundle during installation. Twisting further reduces the cost of and potential damage during shipping and installation. It may also be desirable to render installation of the cables as easy as possible for production. Thermal and power quality requirements also constrain the cable separation and potential impact due to twist of the cables within the power feeder bundle.

Earlier powerfeeder spacers which secure multiple power cables in a bundle have a tendency to unravel or collapse during bundle assembly, uncoil during transportation, installation, or for servicing and maintenance during the functional life of the power feeder bundle. Furthermore, the power feeder bundles which utilize these spacers may require costly transportation and installation methods.

SUMMARY

The disclosure is generally directed to a powerfeeder spacer. An illustrative embodiment of the powerfeeder spacer includes a spacer hub, a neutral cable opening having an interior cable opening wall extending through the center of the spacer hub, a plurality of symmetrically spaced power cable notches formed between spacer fingers extending from the spacer hub.

BRIEF DESCRIPTION OF THE ILLUSTRATIONS

FIG. 1 is a front view of an illustrative embodiment of the powerfeeder spacer.

FIG. 2 is a side view of an illustrative embodiment of the powerfeeder spacer.

FIG. 3 is a sectional view, taken along section lines 3-3 in FIG. 1, of the powerfeeder spacer.

FIG. 4 is a perspective view, partially in section, of a power feeder bundle, with multiple powerfeeder spacers of an alternative illustrative embodiment securing a central neutral cable and multiple power cables in the power feeder bundle in a twist configuration.

FIG. 5 is a sectional view of an illustrative embodiment of the powerfeeder spacer in the power feeder bundle, with a central neutral cable extending through a neutral cable opening and a pair of power cables extending through a pair of power cable notches, respectively, provided in the powerfeeder spacer.

FIG. 6 is front view of an alternative, illustrative two-piece embodiment of the powerfeeder spacer, with a central neutral cable (shown in phantom) extending through a neutral cable opening and multiple power cables (also shown in phantom) extending through multiple power cable notches, respectively, in the powerfeeder spacer.

FIG. 7 is an exploded front view of the two-piece embodiment of the powerfeeder spacer, with a pair of spacer subunits detached from each other.

DETAILED DESCRIPTION

Figure 8:
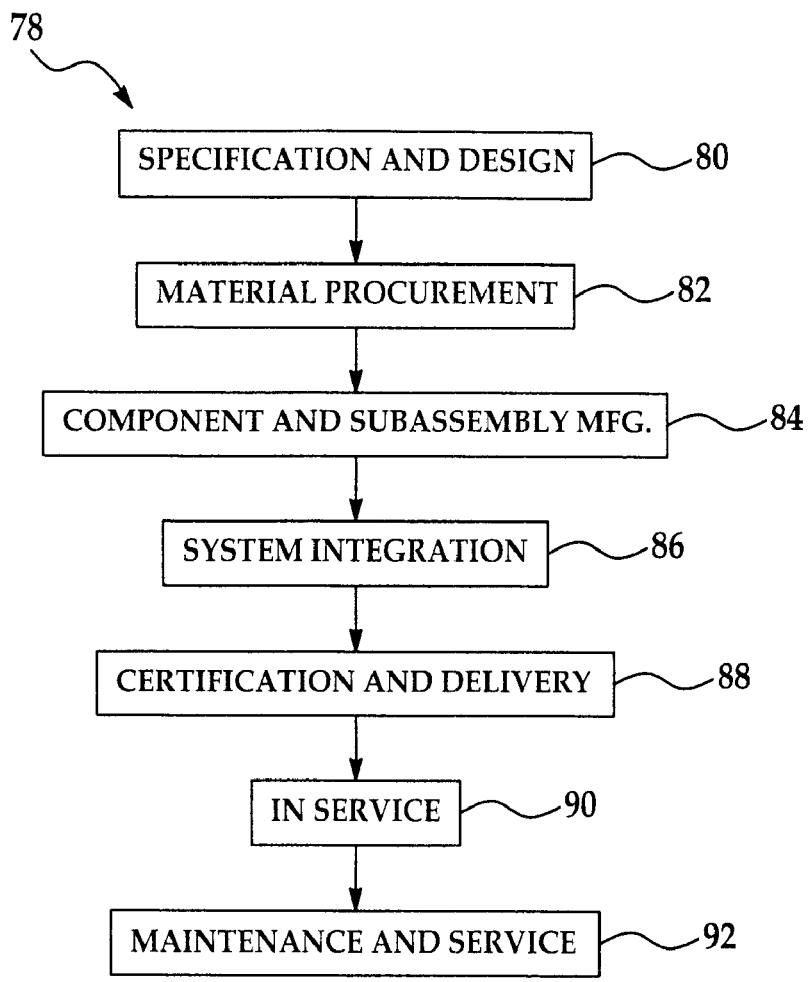
FIG. 8 is a flow diagram of an aircraft production and service methodology.

Referring initially to FIGS. 1-5, an illustrative embodiment of the powerfeeder spacer is generally indicated by reference numeral 1 in FIGS. 1-3 and 5. The powerfeeder spacer 1 may be fabricated from a thermally-stable material which may be a rigid rubber or plastic such as PEEK (polyetheretherketone) or foam PTFE (polytetrafluoroethylene), for example and without limitation. The rubber or PEEK may be used in high-temperature applications (such as near the engine compartment of an aircraft) whereas the PTFE may be used in lower-temperature applications (such as the fuselage and wing portions of an aircraft), for example and without limitation. The powerfeeder spacer 1 may include a central spacer hub 2. As shown in FIG. 2, the spacer hub 2 may have a first hub surface 2a and an opposite second hub surface 2b. A neutral cable opening 3 having an interior cable opening wall 4 (FIG. 3) may extend through the spacer hub 2.

As shown in FIG. 3, the neutral cable opening 3 may have a cable opening axis 6 which is oriented in generally parallel relationship with respect to the interior cable opening wall 4 and in generally perpendicular relationship with respect to each of the exterior first hub surface 2a and second hub surface 2b. As shown in FIG. 1, a cable opening slot 5 may extend through the spacer hub 2 and communicate with the neutral cable opening 3 for purposes which will be hereinafter described.

Multiple spacer fingers 8 may extend outwardly from the spacer hub 2 in generally adjacent, spaced-apart relationship with respect to each other. Each spacer finger 8 may include a finger base 9 which may be generally elongated and extend from the spacer hub 2 and a finger head 10 which terminates the finger base 9. The finger head 10 may be generally wider than the finger base 9 of each spacer finger 8 in order to hold the wire in place in each notch.

A power cable notch 14 may be defined between each pair of adjacent spacer fingers 8. In some illustrative embodiments, such as the powerfeeder spacer 1 which is shown in FIGS. 1-3 and 5, six spaced-apart spacer fingers 8 extend from the spacer hub 2 and six intervening power cable notches 14 are defined between the adjacent spacer fingers 8. In other illustrative embodiments, such as the powerfeeder spacers 1a which are shown in FIG. 4, three spaced-apart spacer fingers 8 extend from the spacer hub 2 and three intervening cable notches 14 are defined between the adjacent spacer fingers 8. The powerfeeder spacer may include any desired number of spacer fingers 8 and any desired number of intervening power cable notches 14 depending on the particular application of the powerfeeder spacer. In some illustrative embodiments, the width of the powerfeeder spacer 1 (distance between the end of one spacer finger 8 and the end of the opposite spacer finger 8) may be about 2 inches (2.1 to 1.8 inches), although the width of the powerfeeder spacer 1 may vary depending on the application and material selected. The distance between adjacent power cable notches 14 may be about 0.2 inches for the six notch configuration, or alternatively, 0.4 inches for a typical three notch configuration, or any other spacing depending on the application of the powerfeeder spacer 1.

Each power cable notch 14 may have a generally curved interior notch wall 15. As shown in FIG. 3, each power cable notch 14 may have a notch axis 16 which is oriented in generally parallel relationship with respect to the interior notch wall 15. The notch axis 16 and therefore, the notch wall 15, of each power cable notch 14 may be disposed at a generally acute twist angle "A" with respect to the cable opening axis 6 (and cable opening wall 4) of the neutral cable opening 3. In some illustrative embodiments, the notch axis 16 and interior notch wall 15 of each power cable notch 14 may be disposed at a twist angle "A" of about 6 degrees, or in a range between about 5.5 degrees and about 6.5 degrees, with respect to the cable opening axis 6 and interior cable opening wall 4 of the neutral cable opening 3. This angle produces a desirable result of producing about a full twist for power cables 22 (FIG. 4) for every 3-4 foot segment of the power feeder bundle 18*a*.

As shown in FIG. 4, in typical application, multiple powerfeeder spacers 1*a* are adapted to secure a central neutral cable 20 and three power cables 22 in a spiraled power feeder bundle 18*a*. In the application shown in FIG. 5, multiple spaced-apart powerfeeder spacers 1 (one of which is shown in cross-section) secure the central cable 20 and six power cables 22 in a spiraled power feeder bundle 18. One spacer is required on average every six inches, (five to seven inches).

A neutral cable 20 extends through the neutral cable openings 3 of each of the successive powerfeeder spacers 1*a* (FIG. 4) or the neutral cable opening 3 at the center of each successive powerfeeder spacers 1 (FIG. 5). The neutral cable 20 may be positioned in the neutral cable opening 3 by extending the neutral cable 20 through the cable opening slot 5 in the spacer hub 2. Power cables 22 extend through the power cable notches 14. In the embodiment of the powerfeeder spacer 1*a* which is shown in FIG. 4, three power cables 22 extend through the three cable notches 14, respectively, of each powerfeeder spacer 1*a*. In the embodiment of the powerfeeder spacer 1 which is shown in FIGS. 1-3 and 5, six power cables 22 extend through the six cable notches 14, respectively, of each powerfeeder spacer 1. Accordingly, the twist angle "A" (FIG. 3) of the interior notch wall 15 of each power cable notch 14 with respect to the cable opening axis 6 of the neutral cable opening 3 may impart a repeating twist or spiral configuration to the power cables 22 around the neutral cable 20. In some illustrative embodiments, the twist angle "A" is about 6 degrees, in which case each of the power cables 22 may undergo a full twist for every 3-4 foot segment of the power feeder bundle 18. In some illustrative embodiments, the width of each powerfeeder spacer 1, 1*a* may be 2 inches and may maintain a 0.2" thermal separation between the power cables 22 while meeting VF power quality requirements for the six power cables (in the embodiment of the powerfeeder spacer 1 shown in FIGS. 1-3 and 5) or for the three power cables (in the embodiment of the powerfeeder spacer 1*a* shown in FIG. 4). The separation between the power cables 22 may reduce thermal impact of the power cables 22 but must balance the adversely affects to power drop in the power feeder bundle 18, 18*a*. The twist angle "A" (FIG. 3) may balance the minimum weight penalty which is induced by the twist configuration while affording the required electromagnetic interference protection.

The powerfeeder spacers 1, 1*a* may maintain the required spatial separations between the power cables 22 as well as provide ease in coiling of the power feeder bundle 18. This may facilitate compact transportation and an easier and quicker factory installation of the power feeder bundle 18, 18*a* for production while maintaining a required twist and meeting engineering power quality and thermal performance of the power feeder bundle 18, 18*a*. The engineering twist or spiral configuration requirement for the power cables 22 may be easily maintained throughout shipping, installation and use of the power feeder bundle 18, 18*a*. This eliminates the need to re-induce the spiral or twist in the power feeder bundle 18, 18*a* which may uncoil during installation and servicing.

The spiral or twist configuration of the power feeder bundle 18, 18*a* may optimally trade the thermal requirement against the power quality of the power feeder bundle. For example, a power feeder bundle configuration which optimizes power quality may be a tightly-wrapped seven-wire bundle. Each power cable in the bundle may have a wire temperature of about 218C/424F in a 100C/212F ambient, at an altitude of 39,000 ft. and with a 250 kVA load. Although these parameters result in a minimal voltage drop (V), the wire temperature exceeds the specified temperature range (175C/350F) of most aluminum wires by a wide margin (43C/77F). Increasing the wire of the power feeder bundle one gauge size could add over 100 lbs. of weight a typical widebody aircraft with four generators.

By creating a spacer with a 0.2" spacing between adjacent power cables 22 in the power feeder bundle 18, 18*a*, under the same conditions the wire temperature may be about 176C/349F (the maximum specified wire temperature range for aluminum wiring is 177C/357F). This results in a voltage drop of about 10.0 V, satisfactorily below the DO-160 industry accepted Power Quality limits. Further increasing the spacing between adjacent cables 22 would result in further lowering the wire temperature but the voltage drop would increase to above the specified 10.5 V limits for a 230 VAC system.

Referring next to FIGS. 6 and 7, an alternative illustrative embodiment of the powerfeeder spacer 1*b* may be similar in design to the powerfeeder spacer 1 of FIGS. 1-3 and 5. Plastic powerfeeder spacers 1*b* may include a symmetrical pair of similar spacer subunits 26 which may be detachably fitted to each other to define the powerfeeder spacer 1*b*. The hub portion 2 of each spacer subunit 26 may include a semicircular neutral cable opening notch 3*a*.

When the spacer subunits 26 are attached to each other, the neutral cable opening notches 3*a* together may interface to define the neutral cable opening 3. The spacer subunits 26 may be attached to each other using any suitable technique which is known to those skilled in the art. For example, in some illustrative embodiments, typically rubber, a tab slot 27 and a tab 28 may be provided on the hub portion 2 on opposite sides of the neutral cable opening notch 3*a*. The tab slot 27 of each spacer subunit 26 may be adapted to detachably receive the tab 28 on the other spacer subunit 26 in a snap-fit to attach the spacer subunits 26 to each other. Accordingly, each of multiple powerfeeder spacers 1*b* may be assembled on a neutral cable 20 (FIG. 5) of a power feeder bundle 18 by placing the cable opening notches 3*a* on opposite sides of the neutral cable 20 and snap-fitting the tab 28 on each spacer subunit 26 in the tab slot 27 of the other spacer subunit 26.

Figure 9:
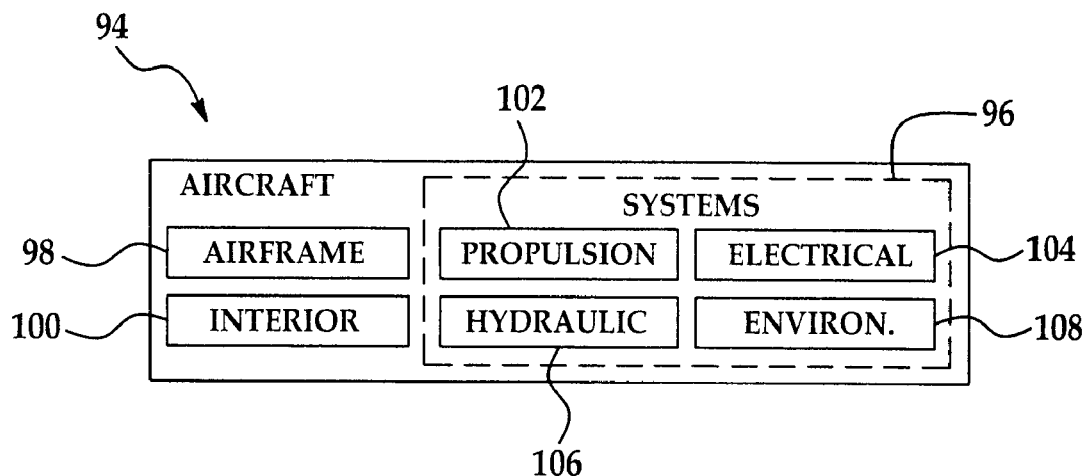
FIG. 9 is a block diagram of an aircraft.

Referring next to FIGS. 8 and 9, embodiments of the disclosure may be used in the context of an aircraft manufacturing and service method 78 as shown in FIG. 8 and an aircraft 94 as shown in FIG. 9. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 is scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A powerfeeder spacer, comprising:
a disc shaped spacer hub;
a neutral cable opening having an interior cable opening wall extending through said spacer hub;
a plurality of spaced-apart spacer fingers extending from said spacer hub; and
a plurality of spaced-apart power cable notches each having a generally curved notch wall between said plurality of spaced-apart spacer fingers, said plurality of notches opened at a periphery of said spacer hub and said powerfeeder spacer, each of said notches adapted to hold a respective power cable in a specific position comprising a twist angle.

2. The powerfeeder spacer of claim 1 wherein each of said plurality of spaced-apart spacer fingers comprises a generally elongated finger base and a finger head terminating said finger base.

3. The powerfeeder spacer of claim 2 wherein said finger head is generally wider than said finger base.

4. The powerfeeder spacer of claim 1 wherein adjacent ones of said plurality of power cable notches are about 0.2 inches apart.

5. The powerfeeder spacer of claim 1 further comprising a cable opening slot extending through said spacer hub and connecting with said neutral cable opening.

6. The powerfeeder spacer of claim 1 further comprising a first spacer subunit and a second spacer subunit detachably attached to each other.

7. The powerfeeder spacer of claim 1 wherein said plurality of spaced-apart spacer fingers comprises three spacer fingers and said plurality of spaced-apart cable notches comprises three cable notches.

8. A powerfeeder spacer, comprising:
a disc shaped spacer hub;
a neutral cable opening having an interior cable opening wall extending through said spacer hub;
a plurality of spaced-apart spacer fingers extending from said spacer hub;
a plurality of spaced-apart power cable notches each having a generally curved notch wall between said plurality of spaced-apart spacer fingers; and
said notch wall is disposed at a generally acute twist angle with respect to said cable opening wall, said plurality of notches opened at a periphery of said spacer hub and said powerfeeder spacer, each of said notches adapted to hold a respective power cable in a specific position comprising said twist angle.

9. The powerfeeder spacer of claim 8 wherein said twist angle is in a range about 5.5 degrees and about 6.5 degrees.

10. The powerfeeder spacer of claim 8 wherein each of said plurality of spaced-apart spacer fingers comprises a generally elongated finger base and a finger head terminating said finger base.

11. The powerfeeder spacer of claim 10 wherein said finger head is generally wider than said finger base.

12. The powerfeeder spacer of claim 8 wherein each of said power cable notches has a generally U-shaped configuration.

13. The powerfeeder spacer of claim 8 further comprising a cable opening slot extending through said spacer hub and connecting with said neutral cable opening.

14. The powerfeeder spacer of claim 8 wherein said plurality of spaced-apart spacer fingers comprises six spacer fingers and said plurality of spaced-apart cable notches comprises six cable notches.

15. The powerfeeder spacer of claim 8 wherein said plurality of spaced-apart spacer fingers comprises three spacer fingers and said plurality of spaced-apart cable notches comprises three cable notches.

16. A power feeder bundle, comprising:
a plurality of spaced-apart powerfeeder spacers;
each of said plurality of spaced-apart powerfeeder spacers comprises:
a disc shaped spacer hub;
a neutral cable opening having an interior cable opening wall extending through said spacer hub;
a plurality of spaced-apart spacer fingers extending from said spacer hub; and
a plurality of spaced-apart power cable notches each having a generally curved notch wall between said plurality of spaced-apart spacer fingers;
said notch wall is disposed at a generally acute twist angle with respect to said cable opening wall;
a neutral cable extending through said neutral cable opening of each of said plurality of spaced-apart powerfeeder spacers; and
a plurality of power cables extending through said plurality of spaced-apart power cable notches, respectively, of said plurality of powerfeeder spacers in a generally spiraled configuration, said plurality of notches opened at a periphery of said spacer hub and said powerfeeder spacer, each of said notches adapted to hold a respective power cable in a specific position comprising said twist angle.

17. The power feeder bundle of claim 16 wherein said twist angle is about 6 degrees.

18. The power feeder bundle of claim 16 wherein adjacent ones of said plurality of power cable notches are about 0.2 inches apart.

19. The power feeder bundle of claim 16 further comprising a cable opening slot extending through said spacer hub and connecting with said neutral cable opening.

20. The power feeder bundle of claim 16 wherein each of said plurality of spaced-apart spacer fingers comprises a generally elongated finger base and a finger head terminating said finger base.

* * * * *